United States Patent [19]
Toko et al.

[11] Patent Number: 5,479,282
[45] Date of Patent: Dec. 26, 1995

[54] LIQUID CRYSTAL DISPLAY OF MULTI-DOMAIN STRUCTURE

[75] Inventors: Yasuo Toko; Takashi Sugiyama, both of Yokohama, Japan

[73] Assignee: Stanley Electric Co., Ltd., Tokyo, Japan

[21] Appl. No.: 191,554

[22] Filed: Feb. 4, 1994

[30] Foreign Application Priority Data

Feb. 10, 1993 [JP] Japan .................................. 5-022498
Nov. 24, 1993 [JP] Japan .................................. 5-293455

[51] Int. Cl.$^6$ ................................................ G02F 1/1337
[52] U.S. Cl. .............................. 359/75; 359/63; 359/102
[58] Field of Search ............................ 359/75, 101, 102, 359/63

[56] References Cited

U.S. PATENT DOCUMENTS

| | | | |
|---|---|---|---|
| 3,503,673 | 3/1970 | Heilmeier et al. | 359/91 |
| 4,664,479 | 5/1987 | Hiroshi | 359/102 |
| 4,852,978 | 8/1989 | Davey et al. | 359/101 |
| 5,216,531 | 6/1993 | Hirai et al. | 359/51 |

FOREIGN PATENT DOCUMENTS

| | | | |
|---|---|---|---|
| 0497619 | 1/1992 | European Pat. Off. | |
| 0497619A3 | 8/1992 | European Pat. Off. | |
| 0589264A2 | 3/1994 | European Pat. Off. | |
| 3256922 | 10/1988 | Japan | |
| 4212928 | 8/1992 | Japan | 359/63 |
| 4301618 | 10/1992 | Japan | 359/102 |
| 2076554 | 12/1981 | United Kingdom | 359/102 |
| 2088078 | 6/1982 | United Kingdom | 359/63 |

OTHER PUBLICATIONS

Journal of Applied Physics, vol. 74, No. 3, Aug. 1, 1993, New York, U.S., pp. 2071–2075, Y. Toko et al, "Amoorphous Twisted Nematic–Liquid–Crystal Displays Fabricated by Nonrubbing Showing Wide and Uniform Viewing–Angle Characteristics Accompanying Excellent Voltage Holding Ratios."

Wayne M. Gibbons; "Surface–Mediated Alignment of Nematic Liquid Crystals with Polarized Laser Light"; May 2, 1991; pp. 49–50; Nature, vol. 351.

Y. Iimura; "Alignment Control of a Liquid Crystal on a Photosensitive Polyvinylalcohol Film"; Jan. 15, 1993; pp. 93–96; Japan J. Appl. Phys. vol. 32.

M. Schadt; "Surface–Induced Parallel Alignment of Liquid Crystals by Linearly Polymerized Photopolymers"; Jul. 1992; pp. 2155–2164.

Primary Examiner—William L. Sikes
Assistant Examiner—James A. Dudek
Attorney, Agent, or Firm—Frishauf, Holtz, Goodman, Langer & Chick

[57] ABSTRACT

No rubbing treatment is done on a pair of transparent substrates. A liquid crystal layer is sandwiched between these transparent substrates to exhibit a multi-domain structure wherein liquid crystal molecules are oriented to various directions at the interface between the liquid crystal layer and a transparent substrate so that the liquid crystal molecules can be considered to be orientated at every direction at an equal possibility with respect to the directions in a plane parallel to the transparent substrate. The transparent substrates constitute a liquid crystal display cell having a reference direction such as an observation direction. A pair of polarizers are disposed outside the transparent substrates to have a transmission or an absorption axis aligned with the observation direction.

11 Claims, 6 Drawing Sheets

LIQUID CRYSTAL DISPLAY OF MULTI-DOMAIN STRUCTURE

BACKGROUND OF THE INVENTION

1. Field of the Invention

This invention relates to a liquid crystal display and a manufacturing method thereof, and more particularly to a liquid crystal display and a manufacturing method thereof capable of improving the visual angle.

2. Description of the Related Art

In a liquid crystal display or a liquid crystal cell, the orientation of liquid crystal molecules is changed from one particular state to other different state by some external action. The change in the optical property caused by the change of orientation off the liquid crystal molecules is utilized as a visual change in a display. Usually, the external action is application of an electric field. For orientating liquid crystal molecules in a particular state in the absence of an electric field, the surfaces of the glass substrates which sandwich a liquid crystal layer are usually subjected to orientation treatment.

In a conventional liquid crystal cell of twisted nematic (TN) type, the orientation treatment is achieved by rubbing the glass substrates, which sandwich a liquid crystal layer, with a cloth or the like in one direction, i.e. a so-called rubbing treatment.

A pair of substrates are assembled in such a way that the rubbing directions off the upper and lower substrates are orthogonal to each other. A liquid crystal cell filled with liquid crystal material is sandwiched between a pair of linear polarizers. When the liquid crystal cell is of negative display type, parallel polarizers are disposed, interposing the liquid crystal cell, in such a way that one of the rubbing directions is parallel to the polarization axis of the neighboring polarizer. In the case of positive display, crossed polarizers are disposed, interposing the liquid crystal cell, in such a way that the polarization axes are parallel to the rubbing direction of the neighboring substrate.

When orientation treatment is done by rubbing as stated above, orientated direction of the liquid crystal molecules become uniform on the substrate surface. Then, there occurs angular dependency of the display so that when the display is viewed by an observer, there exists a particular angular range in which the display can not be easily observed.

Figure 4A:
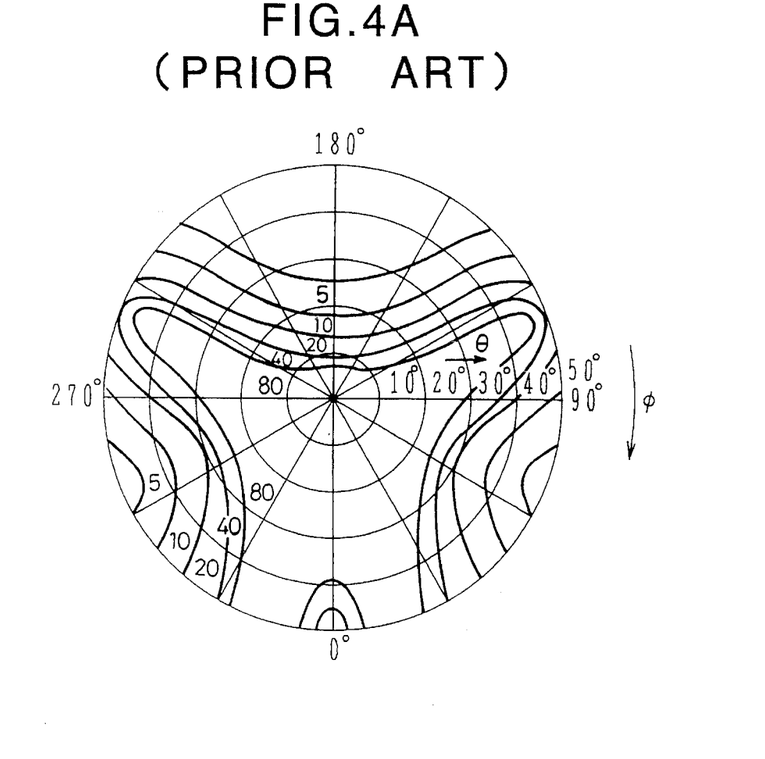
FIG. 4a is a graph showing an example of visual angle characteristics of a liquid crystal display and FIG. 4B is a diagram showing definitions of angles $\theta$ and $\phi$.
Figure 4B:
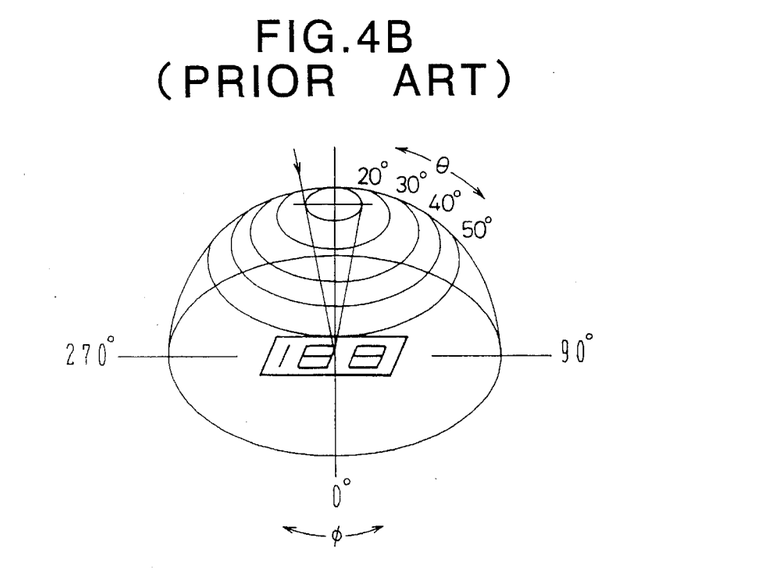

FIG. 4A shows an example of equi-contrast curves representing the visual angle characteristics of a TN type liquid crystal cell. In FIG. 4A, the normal direction to the liquid crystal cell is taken as $\theta=0$, and the polar angle $\theta$ from the normal, is shown radially with $\theta=0$ at the center. The direction in the horizontal plane (substrate surface) is represented by the azimuthal angle $\phi$. These definitions are shown in FIG. 4B.

In FIG. 4A, each thick solid curve represents an equi-contrast curve. A contrast ratio (CR) value is attached to each curve. It can be seen in FIG. 4A, that the visual angle region with high contrast ratio is restricted in particular angular ranges. Therefore, such a liquid crystal cell has visual angle dependency that the cell is easily seen from particular directions but is not so easily seen from other directions.

When a liquid crystal cell having such visual angle dependency is utilized in a display, the contrast is extremely reduced at some angle with respect to the display surface (in case of FIG. 4A around $\phi=180$ degrees). In a more extreme case, the black and white of display can be reversed.

The visual angle dependency as shown in FIG. 4A can be ascribed to the pre-tilt of liquid crystal molecules due to rubbing. The direction of pre-tilt of liquid crystal molecules coincides with the vector direction of rubbing.

When a voltage is applied to a liquid crystal cell, liquid crystal molecules begin to stand up along the pre-tilt direction of liquid crystal molecules. When the display is viewed from that direction, the polarization rotation is easily dissolved. Therefore, the terminating direction of the vector is the direction of easy observation.

Further, rubbing the substrate may generate electro-static charge by friction, which may cause dielectric breakdown of the orientation film, and hence a display defect by insufficient orientation of liquid crystal molecules thereat. Further, in a liquid crystal cell employing active matrix (AM) drive, rubbing a substrate, which has thin film transistors (TFT) or other drive elements and wirings formed thereon, may cause breakage of elements or wirings by the electrostatic charge caused by rubbing. In the case of a simple matrix display, the electrostatic charge caused by rubbing may break thin wirings.

Yet further, when an orientation film is formed on a substrate and rubbing treatment is done thereon, a great amount of fine particles is generated. Those particles may stick to the substrate by electrostatic force and may become a cause off inaccurate gap of the liquid crystal cell and/or of display defects such as black points and white points.

SUMMARY OF THE INVENTION

An object of this invention is to provide a liquid crystal display capable of improving the visual angle characteristics.

Another object of this invention is to provide a liquid crystal display capable of solving the problems arising from the rubbing treatment.

A further object off this invention is to provide a method of manufacturing a liquid crystal display capable of improving the visual angle characteristics.

Another object of this invention is to provide a method of manufacturing a liquid crystal display capable of solving the problems arising from rubbing treatment.

According to an aspect of this invention, there is provided a liquid crystal display comprising a pair of transparent substrates, each having no uniform orientation direction, and jointly constituting display pixels having a reference direction; a liquid crystal layer formed from chiral nematic liquid crystal or nematic liquid crystal and sandwiched between said pair of transparent substrates; a pair of polarizers disposed outside of said pair of transparent substrates and having polarization axis disposed in a predetermined mutual angular relationship, at least one of said polarizers having a transparent axis or absorption axis aligned with said reference direction.

The substrate having no uniform orientation direction can be made without rubbing treatment. No rubbing treatment enables solving various problems arising from the rubbing treatment.

By aligning an axis of the polarizer with the reference axis of the display (for example, the viewing direction), a wide visual angle can be obtained in usual observation state.

BRIEF DESCRIPTION OF THE DRAWINGS

FIGS. 1A to 1F show a liquid crystal display according to embodiments of this invention, wherein

FIGS. 4A and 4B show prior art, in which

DESCRIPTION OF THE PREFERRED EMBODIMENTS

Before the description of the embodiments of this invention, prior work by time inventors and their colleague will first be described. Japanese Patent application 4-236652 (U.S. patent application Ser. No. 8/115,441, European patent application No. 93114150.1), which is incorporated herein by reference, proposed a liquid crystal display which does not need any rubbing and can uniformalize the visual angle dependency.

In this liquid crystal display, a liquid crystal layer is sandwiched between a pair off substrates having no orientation structure. Because the substrate has no orientation structure, the liquid crystal molecules in the cell forms a multi-domain structure constituted by a multiplicity of micro domains. For example, when an area of several hundred micrometers square is considered, a multi-domain structure is formed in this area.

Figure 3A:
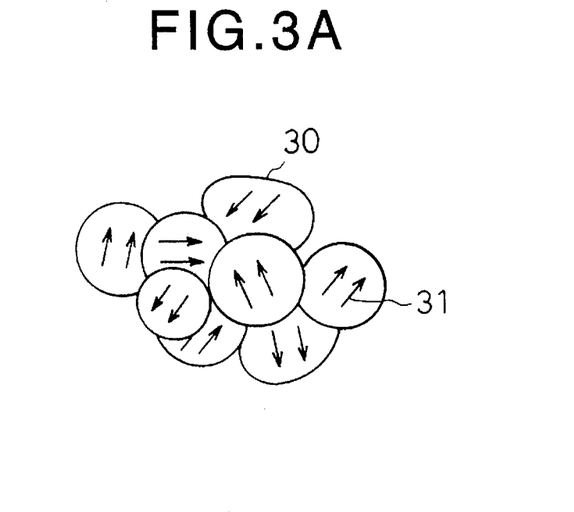
FIGS. 3A to 3C are diagrams showing examples of multi-domain structures.

An example of the multi-domain structure is illustrated in FIG. 3A. There are many micro domains 3θ, in each of which liquid crystal molecules 31 are aligned along a certain direction and exhibit parallel orientation.

When the multi-domain is seen widely as a whole, however, orientation of the domains 3θ are random. It can be considered that the orientations of liquid crystal molecules are directed to every direction on the substrate surface in a liquid crystal cell as a whole.

When such a liquid crystal cell is given a right angle twist by a chiral agent and sandwiched between a pair of linear polarizers having crossed or parallel polarization axes, a liquid crystal display cell of positive or negative type can be obtained.

In an ordinary twisted nematic liquid crystal display, the direction of the polarization axes of the polarizers are automatically determined by the direction of orientation of the liquid crystal molecules. In the liquid crystal display of no orientation structure, since the orientation directions are random in a liquid crystal cell as a whole (equal possibility in every direction), there is no need to align the orientation directions and the polarization axes of the polarizers.

That is to say, provided that the polarization axes of a pair of polarizers are kept in orthogonal or parallel relationship, the polarization axes of the polarizers can be directed to any direction in the plane parallel to the liquid crystal cell substrate.

in the manufacture of a liquid crystal display having no positive orientation structure, the distance between the substrates with no orientation structure is set at a value, for example, which enables a predetermined rotation of the polarization direction, e.g. 90 degrees, and a chiral nematic liquid crystal is injected between the substrates to form a liquid crystal cell. A pair of linear polarizers are disposed to sandwich the liquid crystal cell, without setting any particular relationship between the direction of polarization axes and the substrates, and then fixed. In this way, a liquid crystal display without rubbing treatment can be formed.

Figure 1A:
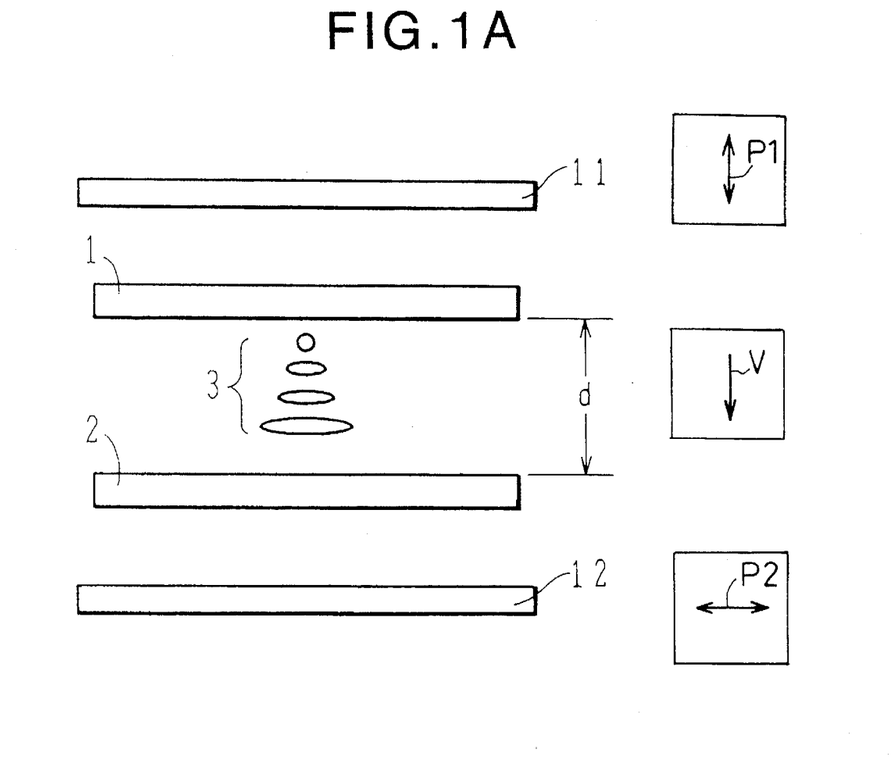
FIG. 1A is a schematic cross sectional view of a liquid crystal display.

FIG. 1A shows a schematic cross sectional view of a liquid crystal display cell according to an embodiment of this invention. In the figure, a liquid crystal layer 3 of chiral nematic type or nematic type is sandwiched between a pair of transparent glass substrates 1 and 2. Outside the substrates 1 and 2, a pair of linear polarizer plates 11 and 12 are disposed parallel to the substrates and to have their polarization axes P1 and P2 in a predetermined mutual angular relationship, for example, orthogonal relationship.

In this liquid crystal display cell, the orientation directions of the liquid crystal molecules at the interface between the liquid crystal layer and the substrates are directed uniformly to every direction when considered in the whole cell. When each micro domain is considered, the orientation directions of the liquid crystal molecules are directed along a certain direction at the interface. FIG. 3A shows such an orientation configuration.

Figure 1B:
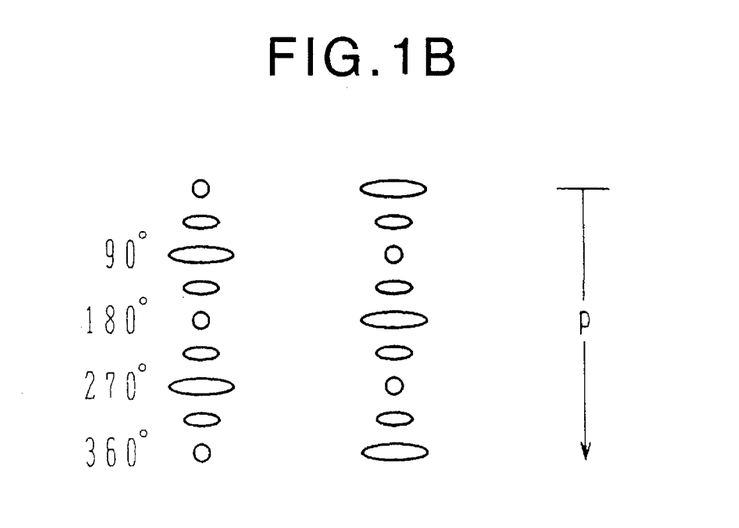
FIG. 1B is an illustrative diagram showing the pitch of chiral liquid crystal.

As shown in FIG. 1B, liquid crystal molecules take a twisted structure varying with the distance from the interface with a chirality defined by d/p, where d represents the thickness of the liquid crystal layer, and p represents the chiral pitch of the chiral nematic or nematic liquid crystal. Here, the nematic liquid crystal is represented by p=∞, and the liquid crystal molecules in each micro domain are aligned along the same direction regardless of the position along the thickness direction.

Orientation and twisting of liquid crystal molecules take a similar configuration in each micro domain of the multi-domain structure. As shown in FIGS. 1B and 3A, the orientation direction differs from micro domain to to micro domain. In the case of a chiral nematic liquid crystal, on the interface on the opposite side substrate, similar multi-domain structure but with every orientation direction rotated by the twist angle is produced.

It is preferable to make a liquid crystal display cell to have a chiral pitch p of the liquid crystal and a thickness d of the liquid crystal layer which satisfy a relation $0 \approx$ or $<d/p<$ or $\approx 0.75$. Here, "A $\approx$ or <B" means that A is approximately equal to or smaller than B. That is to say, values p and d are determined to have a polarization rotation angle, when expressed in degrees, from about 0° to about 270°.

In the ease of a chiral nematic liquid crystal, values p and d are determined to satisfy, for example, $0.15 <d/p<0.75$. For example, a liquid crystal having a chiral pitch p defined by d/p =0.25 (corresponding to 90 degrees twisting) is injected between a pair of parallel transparent glass substrates 1 and 2 separated by a gap d, and sealed.

Figure 1C:
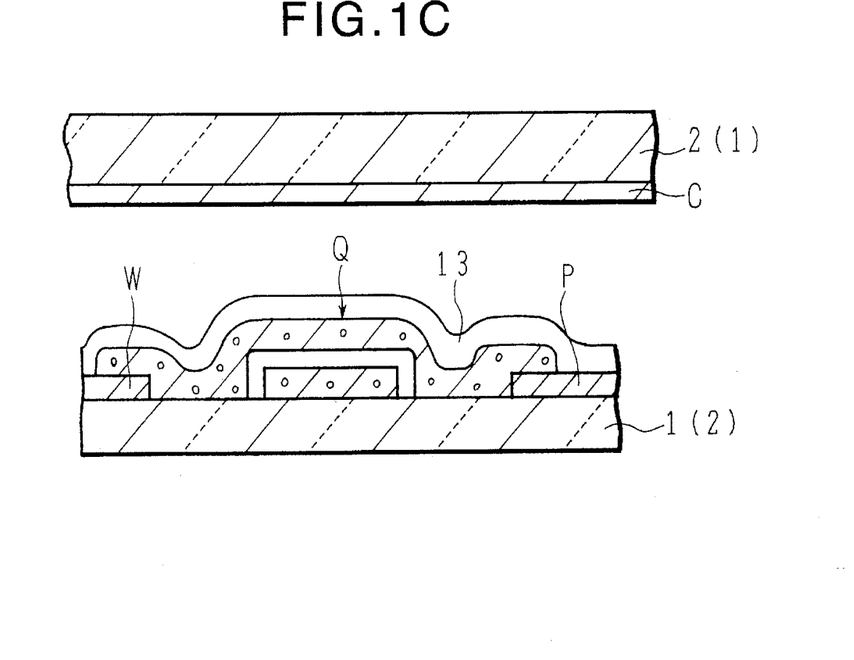
FIG. 1C is a cross sectional view of transparent substrates.

As the liquid crystal material, for example, known nematic liquid crystals and known cholesteric liquid crystals can be used. When twisting nature is to be given, chiral agent may be added to a nematic liquid crystal.

in the case of an active drive system, as shown in FIG. 1C, driving element Q such as a thin film transistor (TFT) using amorphous silicon or polycrystalline silicon, wiring W formed of a metal such as chromium Cr, transparent pixel electrode P Formed of indium-tin-oxide (ITO) etc. are formed on one glass substrate 1(2). It is preferable to further coat these surfaces with an insulating protective film 13.

Further constituents such as black stripe and color filter may also be formed. On the opposing substrate 2 (1), a common electrode C is Formed on the whole surface.

Figure 1D:
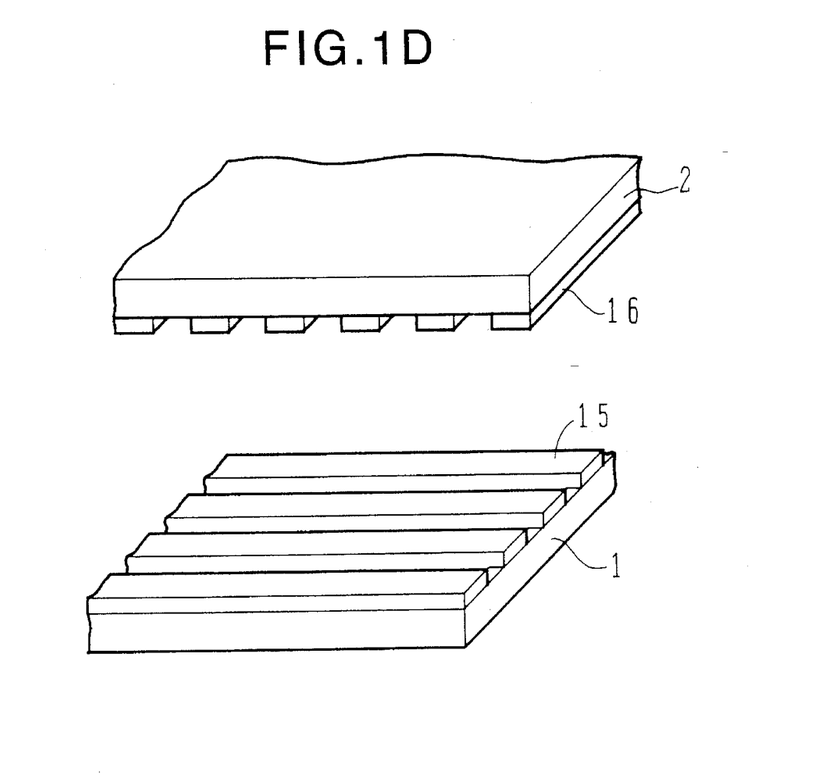
FIG. 1D is a schematic perspective view transparent substrates.

In the case of a simple matrix system, as shown in FIG. 1D, parallel electrodes 15 and 16 are formed on a pair of transparent substrates 1 and 2, and arranged to cross orthogonally. Protective insulating film and/or orientation film may not necessarily be formed on the substrates 1 and 2, but may also be formed, in any case, however, rubbing is not achieved.

Figure 1E:
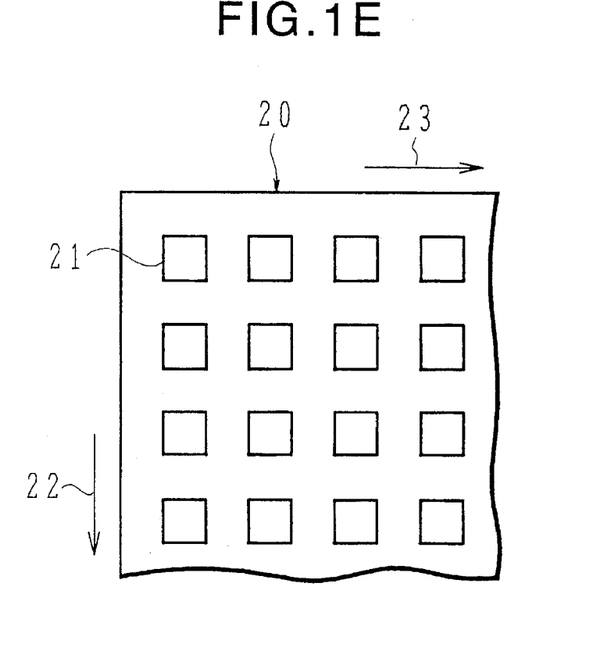
FIG. 1E is a schematic plan view of a liquid crystal cell.

FIG. 1E shows a schematic appearance of an active or a simple matrix display. A matrix display 20 has a multiplicity of pixels 21 disposed in rows and columns. These pixels are defined by the transparent electrode P as shown in FIG. 1C or crossed areas of the crossed electrodes in FIG. 1D. In these matrix displays, the direction of column 22 or direction of row 23 forms a reference direction. The display is designed to present an image when an observer views the display from the direction of a column or row. The reference direction is illustrated by V in FIG. 1A.

For example, when d/p =0.25, a chiral nematic liquid crystal having a chirality pitch p satisfying the value d/p =0.25 with respect to the gap d between the substrates is injected between the substrates. In each micro domain 30 as shown in FIG. 3A, liquid crystal molecules will take a configuration of 90° twist between two substrates. It is noted again that in a multi-domain structure, a multiplicity of domains are directed in every direction at the interface between the liquid crystal layer and a substrate.

Here, when injecting a liquid crystal, the temperature or the liquid crystal is preferably kept equal to or above the N-I point which is the phase transition temperature between the nematic (N) phase and the isotropic (I) phase of the liquid crystal to keep the liquid crystal in the isotropic phase. After injection, the temperature of the liquid crystal cell is gradually lowered below the N-I point to bring the liquid crystal into a liquid crystal phase. This process will make the resultant liquid crystal cell better in display than injecting liquid crystal in the liquid crystal phase.

Here, it is more preferable to also keep the temperature of the substrates before injection of the liquid crystal equal to or above the N-I point and to inject the liquid crystal between the substrates. Then, the temperature of the substrates may be gradually lowered below N-I point. The resultant liquid crystal cell becomes better in display by this method.

It can be expected that the liquid crystal in a cell without any orientation force will take a multi-domain structure, when considering that the liquid crystal in bulk state (a state without any external orientation force) takes a multi-domain state. Especially, it is considered that the tendency of taking a multi-domain structure becomes stronger and that the size of micro domains in a multi-domain structure when it is injected between the substrates while keeping the temperature of the liquid crystal equal to or above the N-I point becomes more uniform.

In the case of a 90° twisted liquid crystal display cell, the orientation of the polarization axes of the polarizers are orthogonal in the case of positive display and parallel in the case of negative display. In the case of 0° twisted liquid crystal display, this relation is reversed. Although there is no reference direction of orientation such as rubbing direction on the substrate surface, there is a reference direction in a display determined in relation with the driving circuit, to define an observation direction. For example, in a matrix type display, the direction of a row or column of the matrix will become the reference direction. In a segment type display such as a seven segment display, the reference direction is defined by the direction from which the segment display is seen to recognize figure "8".

Figure 2A:
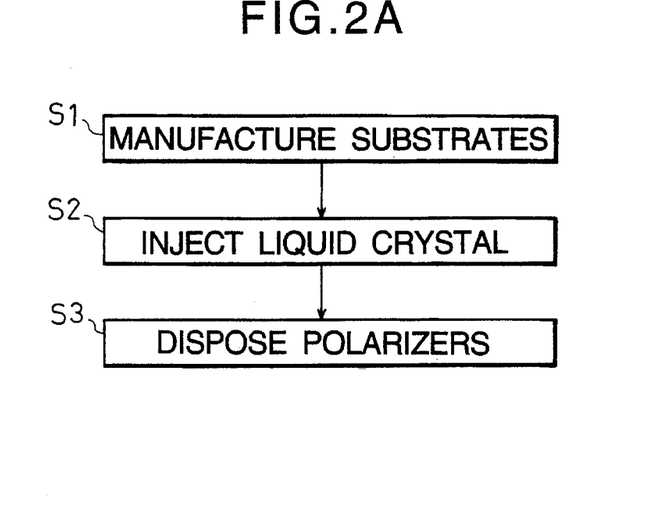
FIG. 2A shows a flow chart of a method of manufacturing a liquid crystal display according to another embodiment of this invention.
Figure 2B:
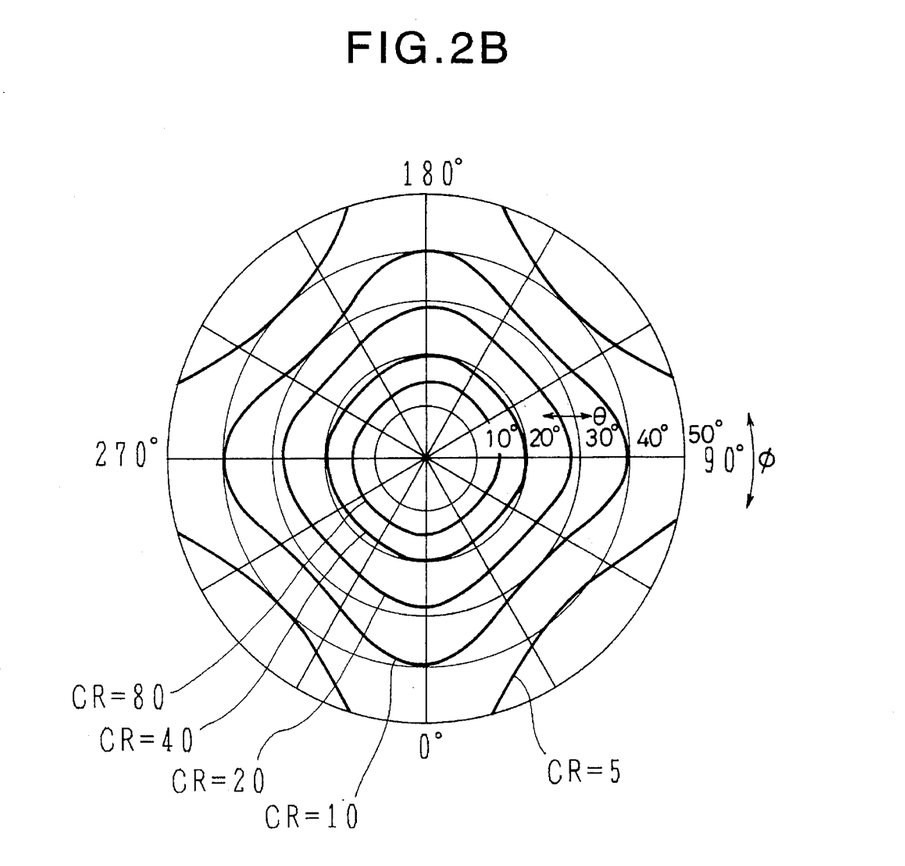
FIG. 2B is a graph showing an example of visual angle characteristics of a liquid crystal display according to the embodiment of this invention.

FIG. 2B shows an example of visual angle characteristics obtained in the liquid crystal display cell of FIG. 1A. The direction of observation by an observer is set at the angle $\phi=0°$, wherein the polarization axis of the polarizer on the observer side is directed 0°–180°, and the polarization axis of the polarizer on the rear side is set at 9 0°–270° (horizontal direction). Here, in the drawing, contours off equi-contrast ratio CR =80, 40, 20, 10, and 5 are shown by solid curves.

Compared to the characteristic of FIG. 4A, it can be seen that a visual angle characteristics of very small directional dependency was obtained. It can be ascribed to the feature of not having any orientation structure on the substrates, thereby uniformalizing respective directions.

The equi-contrast curves CR, however, have direction dependency. Contrast is high in directions of polarization axes of the polarizers (direction of 0°–180° and the direction of 90°–270°), and is low in the intermediate angle regions therebetween. That is to say, there are regions of wide visual angle and regions of narrow visual angle.

If the liquid crystal display is seen from the lower right direction (direction of 45°) of FIG. 2B, the vertical and the horizontal visual directions become narrow and the display becomes poor in usual observation. This tendency becomes more significant when the driving voltage becomes high.

When the azimuthal direction is changed by 45° in FIG. 2B, the positions of minimum contrast are changed to the maximum contrast. It can be seen that the directions of wide visual angle and narrow visual angle are separated by 45 degrees and distributed at a pitch of 90 degrees. When a display is seen in the usual stale, it is said that an easily observable display can be obtained when the visual angles of vertical and horizontal directions are wide. The contrast in the vertical and horizontal directions (0°–180° and 0°–270°) for the observer becomes high as shown in FIG. 2B, when one of the polarization axes (transmission axis or absorption axis of the polarizer) is brought into coincidence with the reference direction of the display, which is the observation angle of the observer.

FIG. 2A is a flow chart of a method of manufacturing a liquid crystal display according to an embodiment of this invention. The respective steps can be achieved according to the conventional process.

In step S1, electrode lines, driving elements, etc. are formed on a pair of glass substrates. No orientation film is formed on the substrates. Here, an orientation film may be formed but no rubbing treatment is done thereon.

In step S2, a pair of glass substrates are disposed face to face. Gap controlling members such as quartz balls are distributed between the substrates and the substrates are fixed at a predetermined gap. Peripheries of the substrates are sealed and then a liquid crystal material is injected between the substrates. The gap of the liquid crystal cell is selected as described above.

It is preferable in the step injecting a liquid crystal material into a cell that the liquid crystal is maintained at a temperature of N-I point or above. Heating the liquid crystal cell at the same time is more preferable as described above.

In step S3, the liquid crystal injection port is sealed and a pair of polarizers are disposed to sandwich the liquid crystal cell substrates from the both sides. The two polarizers are kept in orthogonal relationship, for example, and the polarization axis or absorption axis of one of polarizers is set at the observation angle which is the reference direction of the disk, lay (the direction at which possibility of observing the display is highest, in this case 0°, 90°, 180° and 270°). In this way, a liquid crystal display having such characteristics as shown in FIG. 2B is formed.

Multi-domain structures in the above embodiments can schematically be shown as in FIG. 3A. FIG. 3A is an enlarged plan view of the cell. A multiplicity of minute regions, i.e. micro domains 30 are formed, and liquid crystal molecules 31 in each micro domain 30 are aligned substantially parallel in a certain direction as shown by arrows. Here, however, when the cell is seen as a whole or macroscopically, the liquid crystal molecules 31 are directed randomly at all the directions. It can be understood that the visual angle characteristics is effectively isotropic.

By varying the manufacturing conditions in various ways in the manufacturing process of a liquid crystal display cell in the afore-mentioned embodiments, such orientation structures different from the multi-domain structure of FIG. 3A can also be obtained.

Figure 3B:
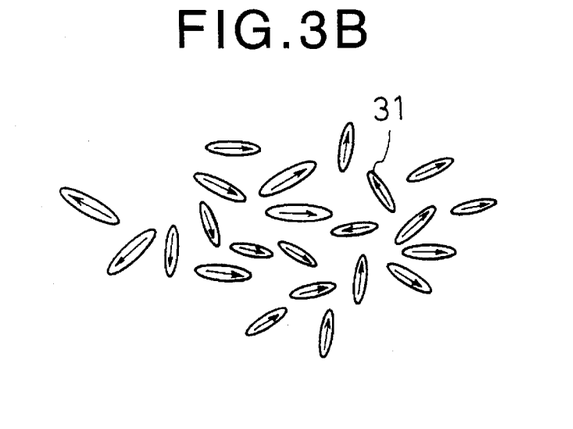

For example, as shown in FIG. 3B, such a structure can be formed wherein liquid crystal molecules 31 do not form particular domains, but change the orientation directions continuously. In the cell as a whole, the orientation directions are random and the liquid crystal molecules 31 are orientated to every direction at equal possibility.

Figure 3C:
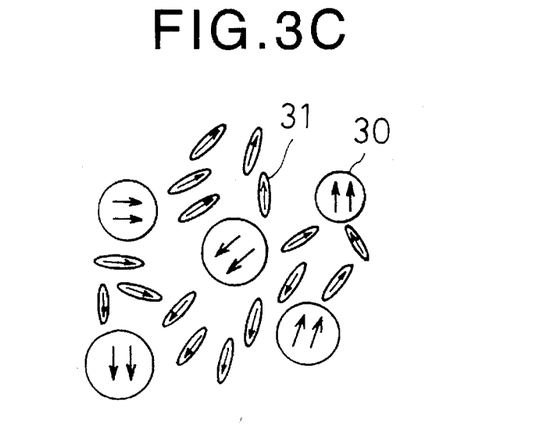

Also, a structure which may be considered as a combination of FIG. 3A and FIG. 3B can be formed as shown in FIG. 3C. That is to say, micro domains 30 are distributed discretely, in each of which liquid crystal molecules are orietated at a uniform direction. Among the micro domains 30, liquid crystal molecules 31 are distributed, while varying the orientation directions continuously. In this case too, the orientation directions as a whole in the cell are random.

The above-mentioned effect of improved visual angle can be obtained with any off the structures as shown FIG. 3A, 3B and 3C.

The above-described embodiments do not employ any positive orientation treatment. In recent years, however, it was found that orientation treatment is possible without performing any rubbing treatment. For example, orientation treatment of minute regions can be done by irradiating a light beam, utilizing polarization memory film.

Figure 1F:
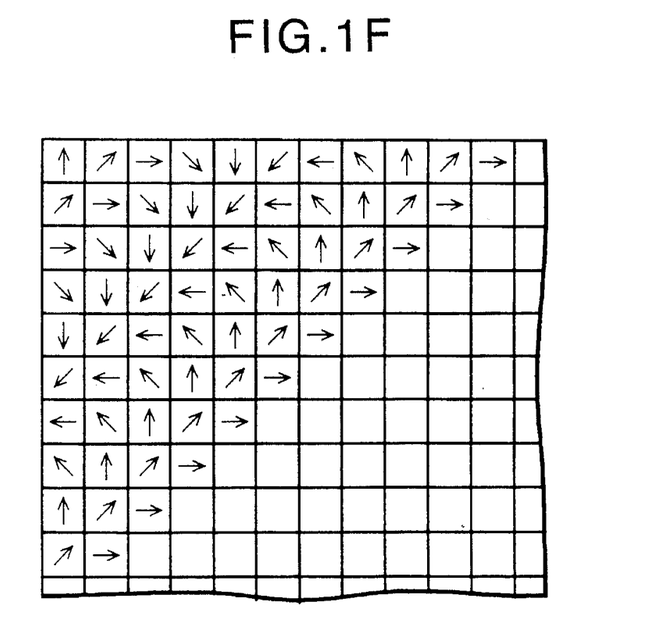
FIG. 1F is a schematic plan view of a liquid crystal cell utilizing polarization memory film.

FIG. 1F shows an example of such positive orientation structure. The display surface is divided into a multiplicity of small regions. A polarization memory film is coated on a substrate and the polarization axis of exposing light is varied from region to region. Orientation structure is formed by such polarized light beam. A display cell is formed by utilizing at least one such substrate. The display cell includes a large enough number of such small regions to exhibit orientation directions at effectively all directions at each pixel. It is necessary to include orientation directions of various directions so that each pixel can be considered to have random orientation directions by utilizing a substrate or substrates subjected to such orientation treatment. A multi-domain structure similar to those described above can be formed. Because no rubbing treatment is done, similar effects of performing no rubbing treatment can be obtained. Here, the polarization memory film can be formed by 1) silicon polyimide doped with diazo amine dye (Wayne M. Gibbons et al, NATURE Vol. 351(1991) p.49, 2) polyvinyl alcohol (PVA) doped with azo-based dye (Yasufumi Iimuya et al, 18th Liquid Crystal Conference—The Chemical Society of Japan, 64th Autumn annual meeting, p 34, Sep. 11, 1992, or Jpn. J. Appln. Phys. Vol 32 (1993), pp L93–96), 3) photopolymerized photopolymer (Martin Schadt et al, Jpn. J. Appl. Phys. Vol. 31 (1992), pp 2155–2164), etc.

Although this invention has been described with reference to embodiments thereof, this invention is not limited thereto. It will be apparent for those skilled in the art that various modifications, alterations, combinations, etc. can be done within the scope and the sprit of this invention as defined by the appended claims.

We claim:

1. A liquid crystal display comprising:

a pair of transparent substrates, each substrate having no uniform orientation direction, said substrates being arranged to oppose each other with a space therebetween, and said substrates jointly constituting display pixels having a standard observation direction;

a liquid crystal layer of chiral nematic liquid crystal or nematic liquid crystal sandwiched between said pair of transparent substrates;

an orientation of liquid crystal molecules of said liquid crystal layer being macroscopically omnidirectional with respect to directions in a plane parallel to said pair of substrates so that there is an equal probability of orientation of a molecule in each of a plurality of directions in said plane;

said liquid crystal molecules providing a multiplicity of continuous micro-domains, each having one of a constant twist angle and no twist angle in a direction perpendicular to said plane parallel to said pair of substrates, and each of said micro-domains of said liquid crystal extending from one substrate to the other substrate; and a pair of polarizers disposed on both sides of said pair of transparent substrates and having polarization axes which are disposed in a predetermined mutual angular relationship, at least one of said polarizers having a transmission axis or absorption axis aligned with said standard observation direction.

2. A liquid crystal display according to claim 1, wherein said pair of transparent substrates have no positive uniform orientation structure.

3. A liquid crystal display according to claim 1, wherein said pair of transparent substrates have a positive orientation structure which corresponds to an intended multi-domain structure.

4. A liquid crystal display according to claim 3, wherein said positive orientation structure comprises a polarization memory film, and has orientation directions distributed to effectively all the directions in the plane parallel to the pair of substrates.

5. A liquid crystal display according to claim 1, wherein said polarization axes of the pair of polarizers are mutually orthogonal.

6. A liquid crystal display according to claim 1, wherein the liquid crystal layer of said chiral nematic liquid crystal or nematic liquid crystal has a chiral pitch p, and a thickness d along a thickness direction sandwiched by said transparent substrates, and values of p and d are selected to satisfy $$0= \text{ or } <d/p< \text{ or } =0.75.$$

7. A liquid crystal display according to claim 6, wherein said liquid crystal layer comprises chiral nematic liquid crystal and said gap d and said chiral pitch p of the chiral nematic liquid crystal satisfy $$0.15<d/p<0.75.$$

8. A liquid crystal display according to claim 1, wherein said polarization axes of the pair of polarizers are mutually parallel.

9. A method of manufacturing a liquid crystal display comprising the steps of:

preparing a pair of transparent substrates having no uniform orientation direction, and a chiral nematic or nematic liquid crystal, the liquid crystal having a chiral pitch p which is finite in the case of chiral nematic liquid crystal and is infinite in the case of nematic liquid crystal;

arranging said substrates to oppose each other with a spacing therebetween;

injecting said chiral nematic or nematic liquid crystal between said pair of transparent substrates which are disposed at such a distance from each other to form a liquid crystal cell that has a multi-domain structure having a multiplicity of micro-domains, each of said micro-domains extending from one substrate to the other substrate with a twist of d/p, the multi-domain structure being macroscopically omnidirectional with respect to directions in a plane parallel to said pair of substrates;

disposing said liquid crystal cell between a pair of polarizers; and arranging at least one of said pair of polarizers to have a transmission axis or an absorption axis aligned with a standard observation direction, while keeping directions of polarization axes of said pair of polarizers in a fixed mutual relationship.

10. A method of manufacturing a liquid crystal display according to claim 9, wherein said step of injecting the liquid crystal between the pair of transparent substrates is carried out while keeping the temperature of the liquid crystal equal to or higher than the N-I point of said liquid crystal.

11. A method of manufacturing a liquid crystal display according to claim 10, wherein said step of injecting the liquid crystal between said pair of transparent substrates is carried out while keeping the temperature of said transparent substrates equal to or higher than the N-I point of said liquid crystal.

* * * * *